No. 721,525. PATENTED FEB. 24, 1903.
C. A. A. RAND.
DRAFT DEVICE FOR HARVESTERS.
APPLICATION FILED JULY 21, 1902.
NO MODEL. 2 SHEETS—SHEET 1.
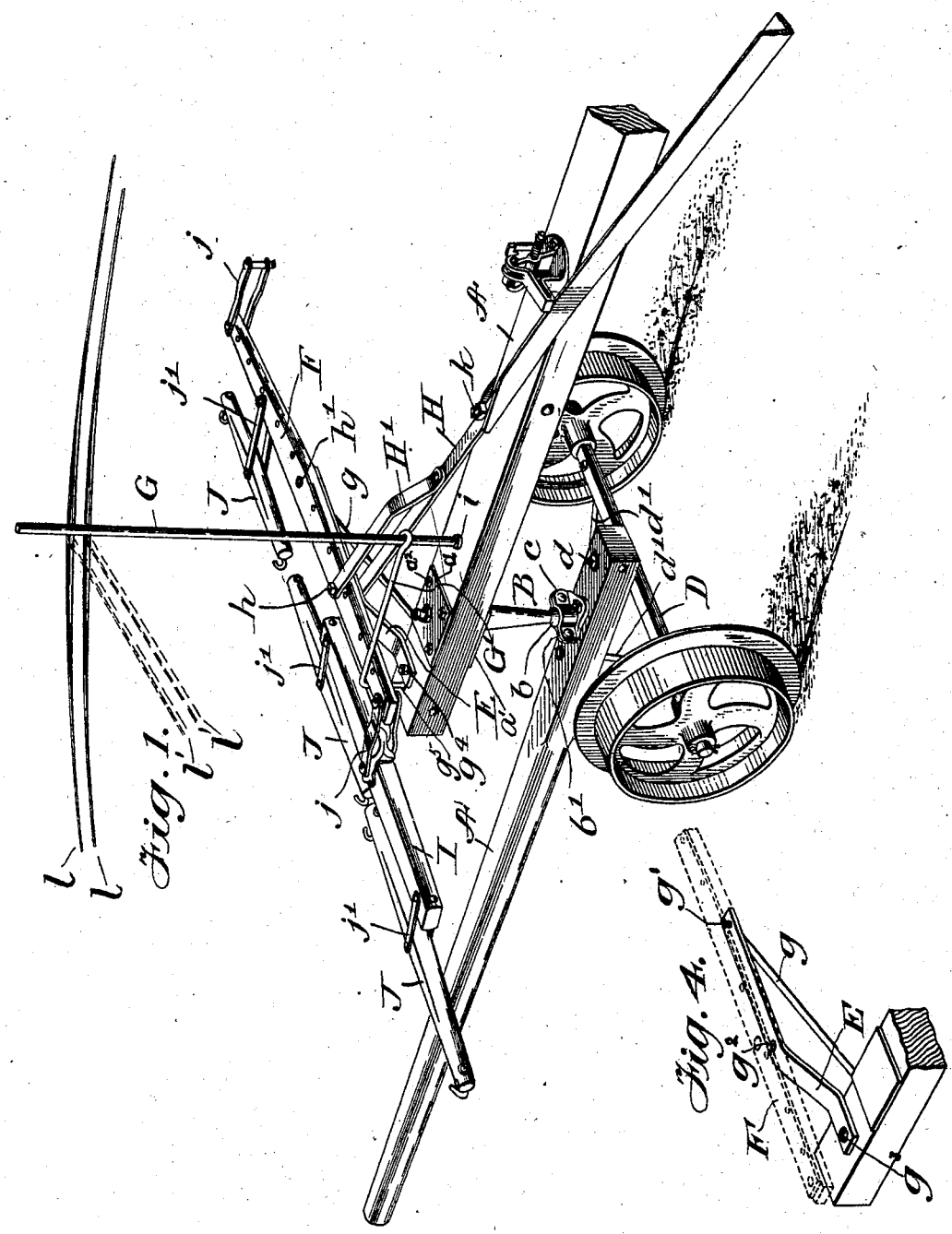
Witnesses:
O. W. Smith
Edw. P. Barrett
Inventor:
Charles A Anderson Rand No. 721,525. PATENTED FEB. 24, 1903.
C. A. A. RAND.
DRAFT DEVICE FOR HARVESTERS.
APPLICATION FILED JULY 21, 1902.
NO MODEL. 2 SHEETS—SHEET 2.
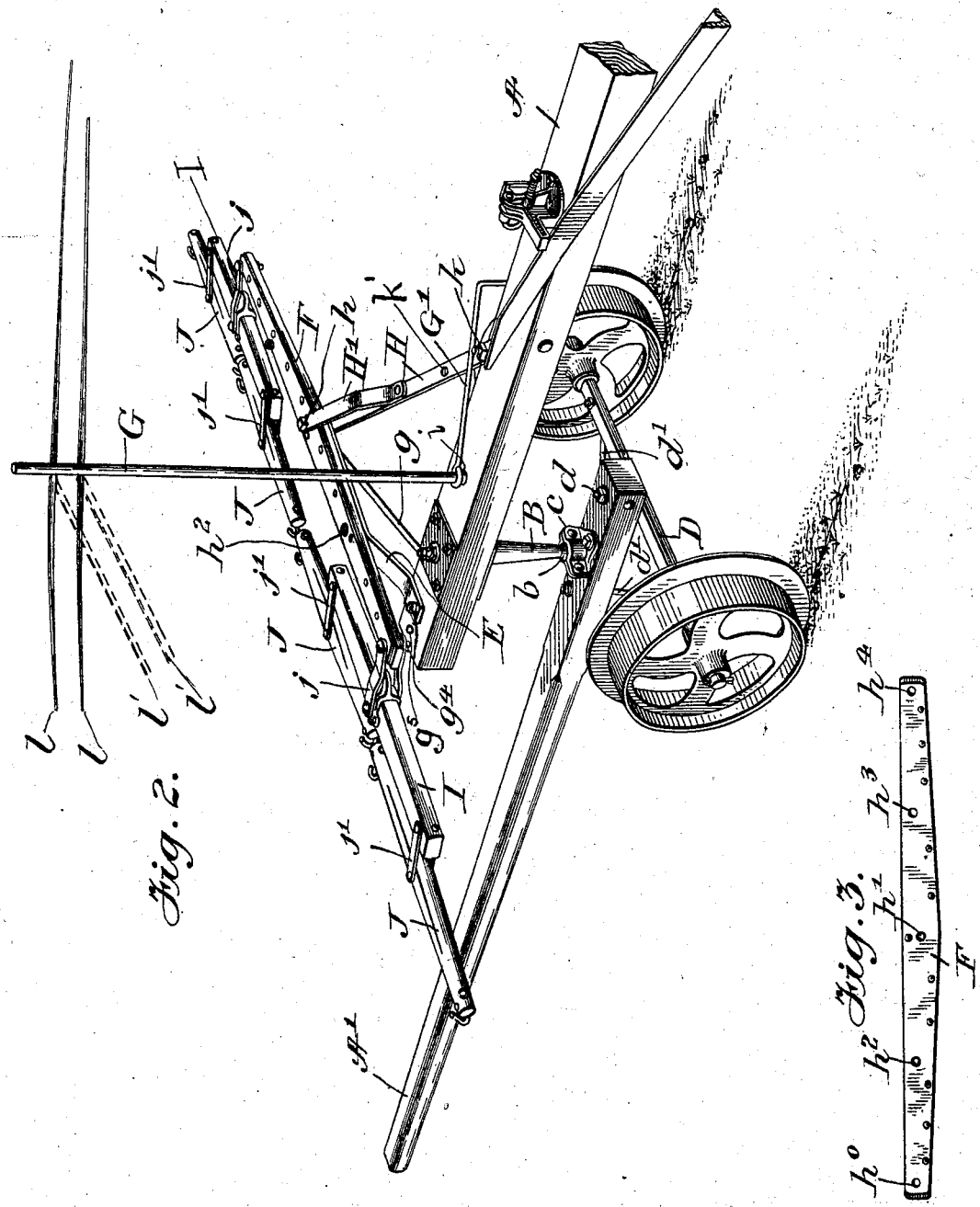
Witnesses:
C. W. Smith
Edward R. Barrett
Inventor:
Charles A. Anderson Rand

UNITED STATES PATENT OFFICE.

CHARLES A. ANDERSON RAND, OF CHICAGO, ILLINOIS, ASSIGNOR TO DEERING HARVESTER COMPANY, OF CHICAGO, ILLINOIS.

DRAFT DEVICE FOR HARVESTERS.

SPECIFICATION forming part of Letters Patent No. 721,525, dated February 24, 1903.

Application filed July 21, 1902. Serial No. 116,376. (No model.)

*To all whom it may concern:*

Be it known that I, CHARLES A. ANDERSON RAND, of Chicago, in the county of Cook and State of Illinois, have invented an Improved Draft Device for Harvesters, of which the following is a full description, reference being had to the accompanying drawings.

My invention relates to draft devices for harvesters or other agricultural implements, and more particularly for such machines when drawn by more than two horses. It is the usual practice among agriculturists to use four horses on a ten-foot-swath machine, three upon seven and eight foot machines, and so on down to two horses. It is, however, necessary when adding another horse or horses to attach them upon the stubble side in order to avoid trampling the uncut grain, and this presents the condition of always adding the horses when found necessary upon the stubble side of the tongue. This will obviously cause side draft, which I overcome by means shown in my Patent No. 657,038, dated August 28, 1900.

The purpose of this invention is to apply an equalizer that will permit the teams to turn sharply when turning corners of the field and to provide a convertible equalizer.

Figure 1 is a perspective view of a tongue-truck supporting the harvester-tongue with my improved equalizer mounted thereon shown as adapted for three horses. Fig. 2 is a perspective view similar to Fig. 1, only my improved equalizer is shown as adapted for four horses. Fig. 3 is a detail view of the equalizer-bar, showing the different points for fastening and attachment. Fig. 4 is a perspective of the end of the stub-tongue, showing the laterally-extending arms forming the support for the equalizer-bar, which is shown in dotted lines in connection therewith.

The usual abbreviated or stub tongue of a harvester thus mounted is represented by A, and the upright post B, terminating below in a ball-like end $b$, forms a connection which will permit a universal movement between said stub-tongue A and the tongue A' of the truck.

The ball-like termination $b$ of the upright post B is received and surrounded by an approximately spherical cup $c$, consisting of two pieces made so for convenience in assembling and removing, and as this is the only connection between the tongue proper and the stub or abbreviated tongue it will appear how readily the two-wheeled truck, whose axle is designated by D, is enabled to ride over any unevennesses encountered in the field.

The axle D of the truck is fastened, preferably, by a bolt $d$ to the tongue A' and is further rigidly secured by brace-rods $d'$, extending from a suitable point on the tongue to points on the axle near the wheels. Extending stubbleward from the forward end of the stub-tongue A and at right angles with the same is the arm E. The said arm is secured to said stub-tongue with a bolt $g^4$, passing through the hole $g^3$ in the arm E and a corresponding hole in stub-tongue A, and near its outer end and also at a point between the pivoted and free end are the holes $g'$ and $g^2$, respectively. Secured near the free end of the arm E by a rivet or otherwise is the strut or brace $g$, the other end of said brace $g$ being secured to the under side of stub-tongue A by the bolt $g^4$. When it is desired to use four horses, then the bolt $h$ passes through the center hole $h'$ of the equalizers F, the hole $g'$ in arm E, and the holes in the free end of the draft-bar H, as shown in Figs. 2 and 4; but if it is desired to use only three horses then the bolt $h$ engages the holes $h^2$ of the equalizer, $g^2$ of the arm E, and the same holes in the free end of the draft-bar H. The free end of the bar being swung in nearer the tongue would of course move the outer end of the arm E forward; but to avoid this and to keep the arm E at right angles with the tongue the bolt $k$ engages a hole $k'$ farther forward on the draft-bar H.

The equalizer-bar F is sheathed on either side by sheet metal for durability and provided at $h^0$, $h^2$, $h'$, $h^3$, and $h^4$ with holes or eyes for the fastening of the doubletrees I, whiffletrees J, its own attachment to the supporting arm or bar E at the different points during its various uses, and the connection of the draft-bar H.

An upright post or rod G is bolted through the stub-tongue at $i$, and pivoted thereon is a stop G', which is preferably of round iron with a downwardly-bent end, adapted to pass over and around the grain-side end of the equalizer-bar F and enter an opening $g^5$ in the tongue A intended to receive it and firmly retain the said grain-side end of said equalizer-bar at right angles to said tongue A. This stop G' is designed to be brought into use only when three horses are employed to draw the harvester, and the draft bar or connection H is attached to equalizer-bar F at $h^2$, (see Fig. 1,) it being dispensed with when the draft connection or bar pivotal point is moved to the middle of equalizer-bar, as at $h'$, Fig. 3.

The rod G extends upward to a considerable height, and while incidentally it affords a pivotal bearing for the equalizer-stop G' its chief function is to keep the lines out of the reel when turning a corner, the position of the lines when in normal condition being as shown by the full lines $l\ l$ and the position when turning as shown by the dotted lines $l'\ l'$. This rod G is located approximately vertically coincident with the pivotal bearing between the truck and draft-tongue A, so that in serving as a line-guide it will operate to keep the lines practically taut. A slight variation from this position would not materially affect the results; but a departure which would excessively slacken the lines would defeat the purpose of this line-guide post. This rod G is set sufficiently rearward that when the teams turn a corner the inner team turning and dropping back will allow the pivotal point of their doubletrees to come well backward relative to the harvester-tongue, so that this team will pull on the main equalizer F endwise, thus operating the same as if the doubletrees L of that team were on the truck-tongue.

The draft bar or connection H is pivotally fastened at $k$ to the stub-tongue A, its forward end adapted to bolt in the holes or eyes $h'$ or $h^2$ in the equalizer F, according to the number of horses to be employed in drawing the harvester. The draft-bar H is strengthened by a flat bar H', riveted or bolted to its upper side, and the two parts embracing the equalizer-bar F and connected to the same bolt $h$.

It will be readily understood that the advantage gained by the foregoing arrangement is that of always having the pull equally distributed on either side of the draft-bar regardless of the number of horses and yet never place more than one animal on the grain side of the tongue, for reasons which are obvious.

The doubletrees are attached to the equalizer-bar in the usual manner by straps or clips $j$, and the whiffletrees are in their turn attached similarly to the doubletrees, these clips being lettered $j'$ wherever shown.

In the use of this draft device the off horse or off team, as the case may be, must not be hitched too closely to the nigh team, which straddles the truck-tongue A'. This is desirable so that the nigh team may turn its doubletree-eye, swinging on the pivot that secures strap $j$ to the equalizer F simultaneously with swinging tongue A' of the truck, which is pivoted at $b$. In short, by reference to the figures it will be seen that the pivot of the doubletree I and the pivot of the truck are sufficiently near a vertical line that both may be termed as substantially upon the same line. When the nigh team is thus turned, the driver's lines are maintained by the rod G in substantially the same relation to the team the harness of which they form a part and to the driver. It is thus seen that he can drive the team as well when turning a square corner as when driving ahead. The principle involved may be made clear by the statement that the position of the pivotal point between the stub-tongue A and the truck-tongue A', the pivotal point between the grain-side doubletree-strap $j$ and the equalizer F, and the rod G are substantially in the same vertical line.

As the draft of the team is depended upon to push the tongue-truck rather than to pull it, the securement of the post B to the draft-tongue A must necessarily be very strong. To give sufficient strength of attachment, I provide a plate $a$ above the draft-tongue and one, $a'$, beneath the same, securing both rigidly to the tongue by means of the bolts $a^2$, and pass the post B through both and through the tongue between them and secure it by a nut on its upper end, which is reduced in size to receive the same. The stop G' is depended upon only when two horses are used, as when the machine is being drawn from field to field and not in labor.

What I claim as my invention, and desire to secure by Letters Patent, is—

1. The combination of the draft-tongue, a support for the equalizer secured thereto; said support having a transposable pivot for the equalizer, and the latter having two pivot-holes whereby the leverage of the equalizer may be changed to adapt it to use for three horses, or four horses, at will, substantially as described.

2. The combination of the draft-tongue, a support for the equalizer secured thereto; said support having a transposable pivot for the equalizer, and the latter having two pivot-holes whereby the leverage of the equalizer may be changed to adapt it to use for three horses, or four horses, at will; said equalizer having two points of attachment for the draft device at its stubble end, whereby a single horse with singletree, or a span of horses with doubletree, may be used substantially as described.

3. In a draft device the combination of draft-tongue A, the truck having a tongue A', said truck pivotally connected to the draft-tongue A, the equalizer F, the doubletree I pivoted thereto, and the rod G forming a stay around which the lines draw, when turning, substantially as described.

4. In a harvesting or a similar machine, a draft-tongue, as A, a supporting-truck pivotally connected thereto, an equalizer-stop, as G', and a post, as G, said post adapted to form both a pivotal support for said equalizer-stop and a line-guide, all combined substantially as described.

5. In a harvesting or a similar machine, a draft-tongue, as A, a supporting-truck pivotally connected thereto, and adapted to turn thereunder, said truck comprising a wheel or wheels suitably mounted, and a controlling-tongue in connection therewith, lines for guiding the draft-animals of said machine, and a post for guiding said lines, said post being located approximately vertically coincident with the pivotal connection between the said draft-tongue and supporting-truck, all combined substantially as described.

6. The draft-tongue A, the truck supporting the same, the said draft-tongue having the plates $a$ and $a'$, the said draft-tongue connected to the said truck by the post B, said post passing through the said draft-tongue and the plates $a'$ and $a$, all combined substantially as described.

CHARLES A. ANDERSON RAND.

Witnesses:
J. C. WARNES,
TORRIS H. ALFREDS.